(12) United States Patent
Barrick et al.

(10) Patent No.: US 11,182,164 B1
(45) Date of Patent: Nov. 23, 2021

(54) PAIRING ISSUE QUEUES FOR COMPLEX INSTRUCTIONS AND INSTRUCTION FUSION

(71) Applicant: INTERNATIONAL BUSINESS MACHINES CORPORATION, Armonk, NY (US)

(72) Inventors: Brian D. Barrick, Pflugerville, TX (US); John B. Griswell, Jr., Austin, TX (US); Dung Q. Nguyen, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/936,924

(22) Filed: Jul. 23, 2020

(51) Int. Cl.
*G06F 9/38* (2018.01)
*G06F 9/30* (2018.01)

(52) U.S. Cl.
CPC ........ *G06F 9/3836* (2013.01); *G06F 9/30196* (2013.01); *G06F 9/384* (2013.01); *G06F 9/3838* (2013.01); *G06F 9/3853* (2013.01)

(58) Field of Classification Search
CPC ......... G06F 9/3836; G06F 9/384; G06F 9/382
See application file for complete search history.

(56) References Cited

U.S. PATENT DOCUMENTS

| | | | |
|---|---|---|---|
| 8,019,944 B1 | 9/2011 | Favor et al. | |
| 8,285,974 B2 | 10/2012 | Singh et al. | |
| 8,370,576 B1 | 2/2013 | Favor et al. | |
| 10,095,524 B2* | 10/2018 | Gschwind | ............... G06F 9/382 |
| 10,387,147 B2* | 8/2019 | Genden | ................. G06F 9/3838 |
| 10,394,565 B2 | 8/2019 | Genden et al. | |
| 2009/0287908 A1* | 11/2009 | Rangan | ................... G06F 9/384 |
| | | | 712/206 |
| 2016/0313992 A1 | 10/2016 | Gschwind et al. | |
| 2019/0042339 A1 | 2/2019 | Doshi et al. | |

OTHER PUBLICATIONS

Sinharoy et al., "IBM POWER8 processor core microarchitecture", IBM J Res. & Dev., vol. 59, No. 1, Paper 2, Jan./Feb. 2015, pp. 2:1-2:21.

Hu et al., "An Approach for Implementing Efficient Superscalar CISC Processors", 12th International Symposium on High-Performance Computer Architecture, HPCA-12 2006, Austin, Texas, Feb. 11-15, 2006, 12 pages.

(Continued)

*Primary Examiner* — William B Partridge
(74) *Attorney, Agent, or Firm* — Teddi E. Maranzano (57) ABSTRACT

Support for instruction fusion is provided. An indication whether an instruction is a paired instruction is received from an instruction decoder. Based on the indication, one dispatch slot or a paired dispatch slot is allocated in the instruction dispatcher queue. A mapper converts logical addresses of sources and targets of the instruction to physical addresses. Either one issue slot or a paired issue slot is allocated in an issue queue based on the indication from the instruction decoder. The instruction execution environment is loaded into the issue queue and issued to an execution unit.

20 Claims, 7 Drawing Sheets

(56) References Cited

OTHER PUBLICATIONS

Hu et al., "Using Dynamic Binary Translation to Fuse Dependent Instructions", International Symposium on Code Generation and Optimization, Mar. 20-24, 2004, CGO 2004, San Jose, CA, 12 pages.

Anonymous Author, "Instruction steering policy for balanced utilization of a bifurcated unified issue queue", An IP.com Prior Art Database Technical Disclosure, IP.com No. IPCOM000179961D, IP.com Electronic Publication Date: Mar. 3, 2009, 3 pages.

Disclosed Anonymously, "Method for Handling Destructive Load Multiple in a System Supporting Instruction Cracking Across Groups", An IP.com Prior Art Database Technical Disclosure, IP.com No. IPCOM000197382D, IP.com Electronic Publication Date: Jul. 6, 2010, 3 pages.

Disclosed Anonymously, "Reduced Register Out of Order Age Priority Processor Instruction Issue Queue", An IP.com Prior Art Database Technical Disclosure, IP.com No. IPCOM000231835D, IP.com Electronic Publication Date: Oct. 8, 2013, 5 pages.

\* cited by examiner

PAIRING ISSUE QUEUES FOR COMPLEX INSTRUCTIONS AND INSTRUCTION FUSION

BACKGROUND

Embodiments of the invention generally relate to computer systems, and more specifically, to support for complex instructions and instruction fusion.

In microprocessor design, power consumption and chip area are factors that affect performance. The cost of adding read ports is a motivation to design instruction flow through the microprocessor to contain the minimum information needed to support most of the instructions. For some instructions, this may be an effective approach. For those instructions that require additional resources, the approach is to break the instruction into a number of micro-instructions that fit the instruction flow of the microprocessor. This approach requires additional dispatch, issue, and execution cycles. For these more complex instructions, it would increase efficiency to pair dispatch slots and issue queue slots so that the instruction can issue as a single instruction.

SUMMARY

Among other things, a method is provided for supporting complex instructions and instruction fusion. The method includes receiving from an instruction decoder an indication whether an instruction requires additional sources or targets and drives to two dispatch slots and forces pairing. The instruction decoder may indicate that two instructions can be fused together and force pairing.

Based on the indication, allocating in the dispatcher queue one dispatch slot or a paired dispatch slot. The method provides for converting by a mapper logical registers to regfile physical addresses. Either one issue slot or a paired issue slot is allocated in an issue queue based on the indication from the instruction decoder. The execution environment for the instruction is loaded into the issue queue. Based on satisfaction of execution dependencies, issuing the instruction for execution.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

The present disclosure relates generally to the field of computing systems, and in particular to pairing dispatch slot entries and issue queue entries to reduce the performance penalty associated with breaking a complex computer instruction into a series of micro computing instructions, which require additional dispatch, issue, and execution cycles to process.

The ability to process large amounts of information in parallel is one of a number of benefits of the increased speed and complexity in computer hardware. One engineering challenge is to optimize power consumption and to control the utilization of chip area. This can be done by adding read ports for increased register access to the chip. However, this option negatively affects power consumption and chip area utilization. Another option is to break an instruction that requires several register inputs/outputs into a series of micro-instructions that can fit the pipeline of the machine. This option requires additional dispatch slots and additional issue cycles to execute the instruction. Also, states of the execution require temporary registers to hold intermediate results. However, pairing both dispatch slots and issue queue slots allows the execution of the more complex instructions within the pipeline of the machine.

Figure 1:
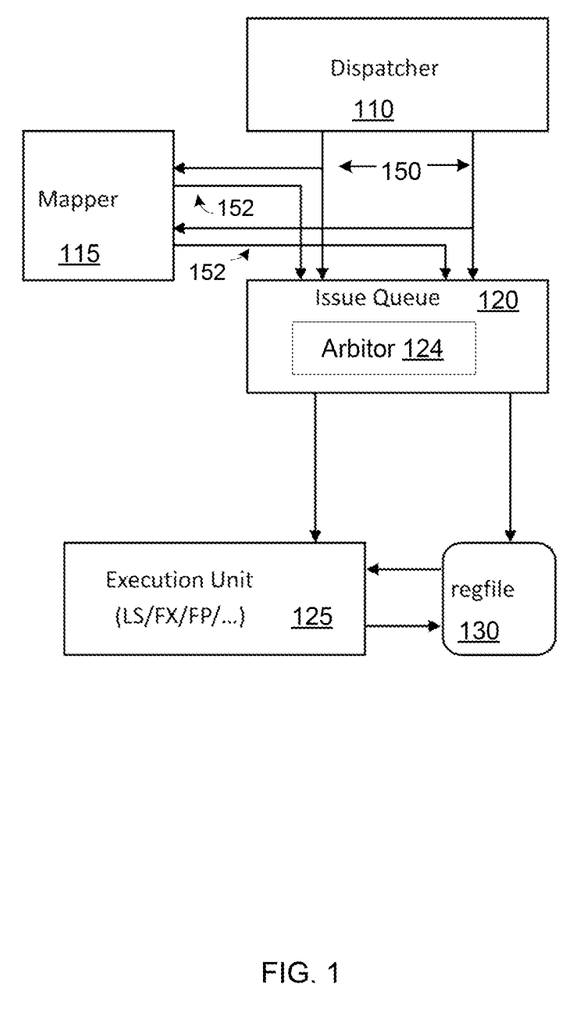
FIG. 1 illustrates a sub-set of an Instruction Sequencing Unit (ISU)

FIG. 1 illustrates a sub-set of an Instruction Sequencing Unit (ISU) according to an embodiment of the present invention.

The dispatcher 110 dispatches instruction information to the mapper 115 and, eventually, to the issue queue 120. For example, the dispatcher 110 parses the instruction to determine the logical location of operands, immediate data, and registers that are required and notifies the mapper 115. In this implementation, each dispatcher port 150 can identify up to three computing registers (e.g., a general purpose register, floating point register, and vector register), and four system registers (e.g., control registers) in combination. The logical registers are sent over the dispatcher ports 150 to the mapper 115. The mapper 115 provides a mapping between logical registers, for example the general purpose registers (GPR) and physical location within the regfile 130. The mapper 115 generates a pointer to each register by locating the offset of the register in the regfile 130 (register file array). Only two dispatcher ports 150 are shown for ease in describing the various embodiments of the invention, but there can be other than two dispatcher ports 150, e.g., eight dispatcher ports 150, depending on the hardware implementation.

The mapper 115 sends the physical addresses of the registers over the ports 152 to the issue queue, and the dispatcher 110 sends the instruction to the issue queue 120 over the dispatcher ports 150. When the instruction is ready to issue, i.e., the physical addresses of the sources and targets are translated, the instruction is released from the dispatcher 110 to the issue queue 120. The arbiter 124 is an age array in the issue queue 120. The arbiter 124 releases the instruction for execution, typically choosing the oldest instruction that is ready to execute so long as all the instruction dependencies are available. The issue queue 120 issues the instruction from the arbiter 124 to the execution unit 125 (e.g., floating point unit, load/store unit, fixed point unit) that is configured with the logic to execute that type of instruction.

Figure 2:
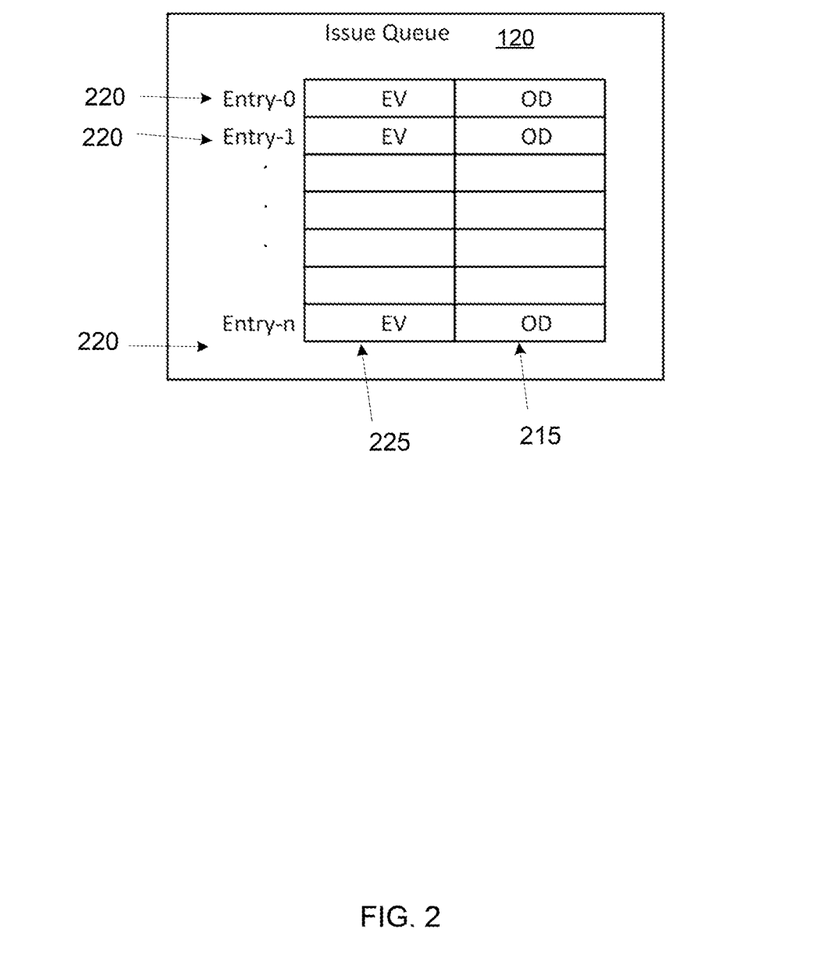
FIG. 2 illustrates the even and odd organization of the issue queue to support pairing of entries together.

FIG. 2 illustrates the even and odd organization of the issue queue 120 to support pairing of entries together, according to embodiments of the present invention.

The issue queue 120 is organized as entries entry-0 220 through entry-n 220. Each entry-n 220 is organized as an independent even and odd pair of slots, EV 225 and OD 215. The instruction decoder (not shown) indicates to the dispatcher 110 whether the instruction is a standard type or is a complex type and will require a full pair of EV 225 and OD 215 to form one entry-n 220. The dispatcher 110 indicates to the issue queue 120 the type of instruction. For standard instructions, the even and odd pair of slots EV 225 and OD 215 are not paired. Each EV 225 or OD 215 can process an independent instruction. For the more complicated instructions which require more information that can be held in the normal dataflow, the even and odd pair of slots EV 225 and OD 215 of the same entry-n 220 are fused together to represent a single instruction. This allows one issue queue entry entry-n 220 to represent a single instruction or two independent instructions. For independent instructions, the issue queue 120 can allocate to any EV 225 or OD 215 slot entry that is available.

Figure 3:
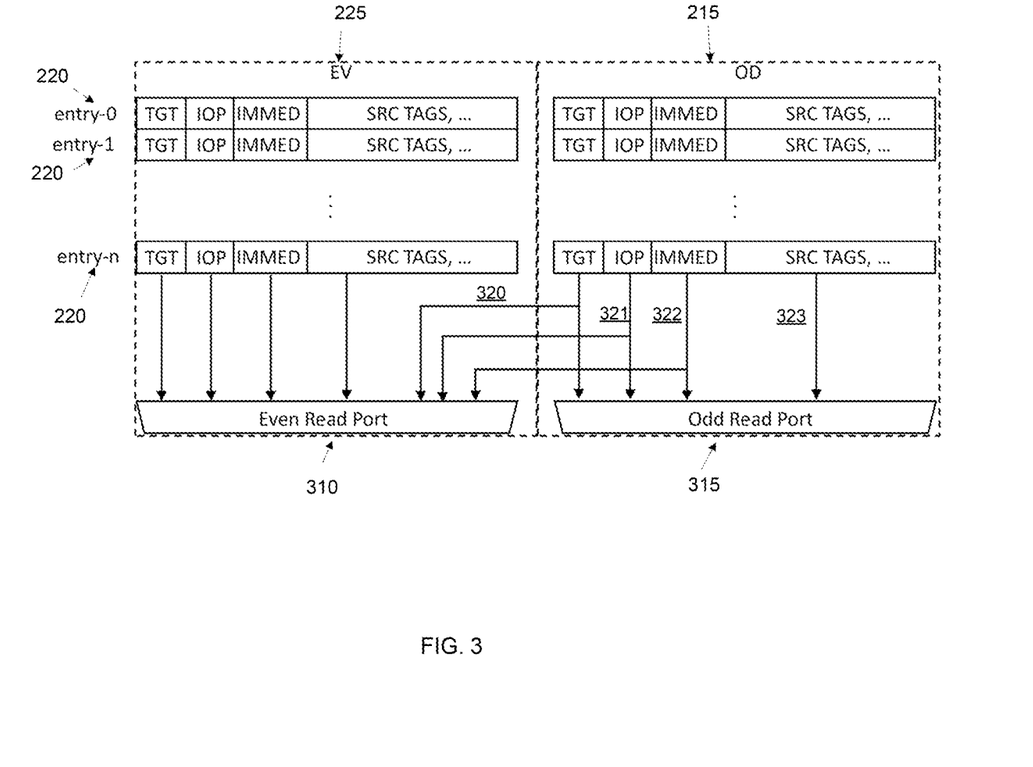
FIG. 3 is a detailed view of the issue queue of FIG. 2.

FIG. 3 shows a subset of data held in an issue queue 120 entry entry-n 220 of FIG. 2.

As illustrated in FIG. 3, the even read port 310 is modified to read out instruction information from the odd read port 315 entry when the even and odd pair EV 225 and OD 215 are fused together to represent a single instruction. As shown, the instruction information includes additional target tgt 320, the instruction opcode iop 321, immediate bits immed 322, and physical tags src tags 323. These are issued out when the EV 225 is selected for issue in a paired instruction. When selecting the EV 225 to issue for an instruction which is not paired, these extra bits from the OD 215 are ignored. Similarly, when the OD 215 is selected to issue, only the information from the OD 215 is read through the odd read port 315.

Figure 4:
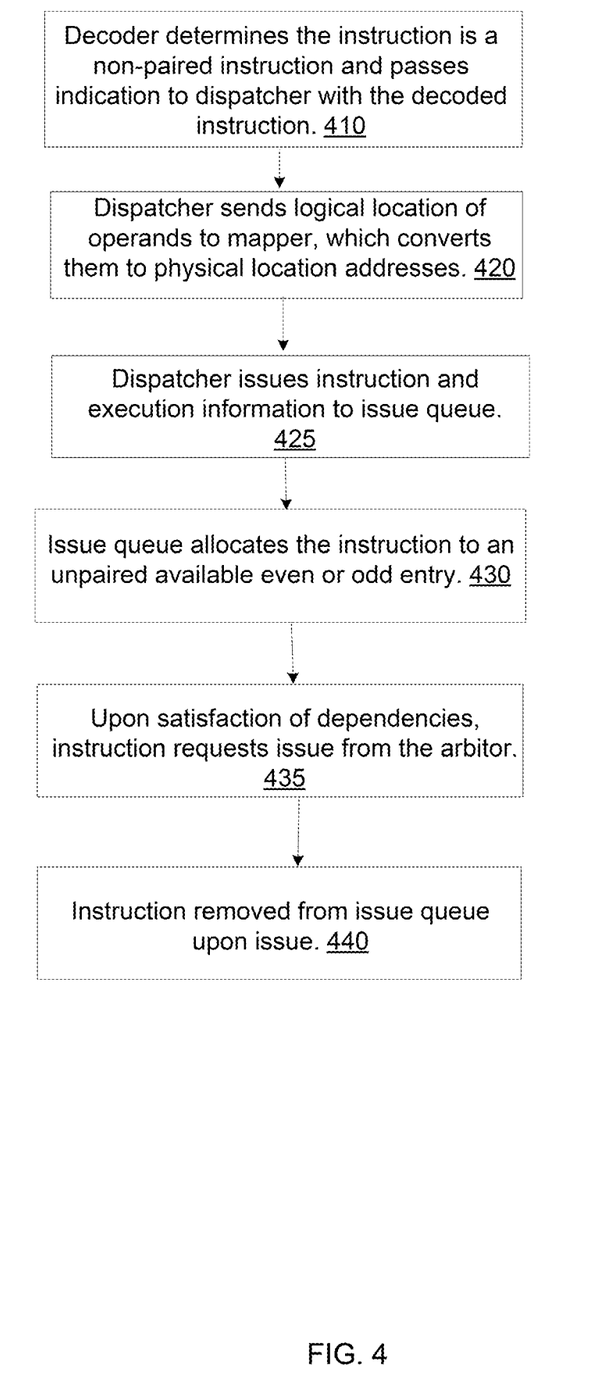
FIG. 4 is a flowchart of issuing a non-paired instruction.

FIG. 4 is a flowchart of issuing a non-paired instruction.

For non-paired instructions, each instruction is dispatched as an independent instruction. This case will allow the issue queue 120 to allocate each instruction for execution to any available EV 225 or OD 215. For this case, each instruction independently presents an issue request to the arbitrator 124 once all the instruction dependencies are met. Once the arbitrator 124 selects the request and the instruction is issued, then the instruction can be removed from the issue queue 120 and the EV 225 or OD 215 it formerly occupied can be used by another instruction.

In FIG. 4, at 410, the instruction decoder determines that the instruction and its operands fit in one either EV 225 or OD 215 issue queue slot in the issue queue 120. The decoder passes an indication of the type of instruction to the dispatcher 110 along with the decoded instruction. The instruction decoder logic is executed prior to the instruction entering the dispatcher 110, and is outside the scope of this flow.

At 420, the dispatcher 110 sends the logical registers for the instruction operands to the mapper 115. The mapper 115 converts the logical registers (such as GPR) into physical addresses in the regfile 130.

At 425, the dispatcher 110 sends to the issue queue 120 the instruction, the indication that the instruction is a non-paired type, and any other information required for the issue queue 120 to prepare the instruction for execution e.g., the opcode, instruction type, from the dispatcher 110.

At 430, the issue queue 120 allocates the instruction and its operands to an EV 225 or OD 215, based on the indication that the instruction is a non-paired type.

At 435, upon satisfaction of all dependencies, the instruction requests the arbitrator 124 to release it for execution. For example, the instruction and its dependencies are known when it is written to the issue queue 120. The mapper 115 can indicate that one of the sources is not yet available, for example, by a pending commit of another instruction. The arbitrator 124 maintains an age array of instructions that are pending issue, and may select for issue the oldest instruction in the issue queue 120 having satisfied dependencies.

At 440, the instruction is issued from the issue queue 120 over the even read port 310 or odd read port 315, depending on whether the instruction is issuing from an even or odd slot. The instruction issues to the execution unit 125 corresponding to the type of instruction, for example a load/store unit (LSU). Upon issue, the instruction is removed from the EV 225 or OD 215, which is made available for another instruction.

Figure 5:
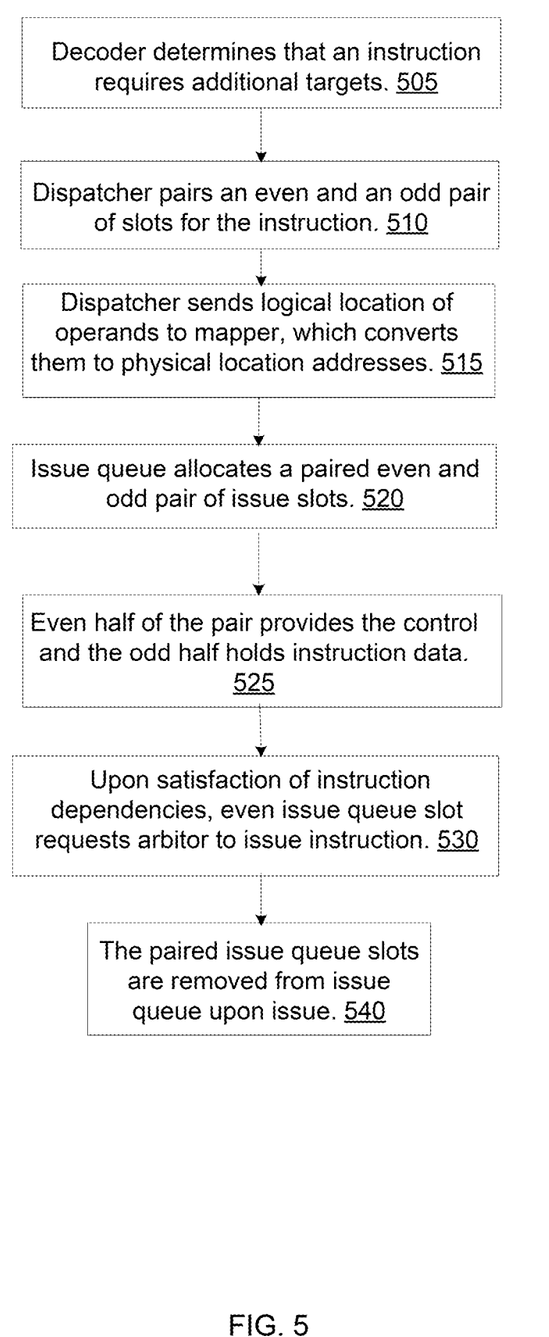
FIG. 5 is a flowchart of issuing paired instructions having additional targets.

FIG. 5 is a flowchart of issuing paired instructions having additional targets.

Based on the indication from the decoder that the instruction requires additional targets, the dispatcher 110 pairs two dispatch slots together to obtain the two targets. The instruction writes into both the EV 225 and the OD 215 pairs of the same entry-n 220. The load quadword instruction is an example of an instruction which operates this way. For this case, the EV 225 slot contains the sources for the load, and the first half of the register pair. The OD 215 slot holds the second half of the register pair for the target. The EV 225 half of the entry pair provides the control and the first register target; the OD 215 half holds the second register target. Once all the instruction dependencies are met, the EV 225 even half requests to the arbitrator 124 to issue. Once selected to issue, the contents of both the EV 225 and a subset of the OD 215 are read out of the issue queue 120 over the even read port 310 to the LSU for execution. When the instruction issue is successful, the full entry pair entry-n 220 is released.

In FIG. 5, at 505, the instruction decoder determines the instruction and its operands do not fit in one either EV 225 or OD 210 issue queue slot in the issue queue 120. The decoder passes an indication of the type of instruction to the dispatcher 110 that a paired issue queue entry-n 220 is needed, along with the decoded instruction. The instruction decoder logic is executed prior to the instruction entering the dispatcher 110, and is outside the scope of this flow.

At 510, the dispatcher 110 receives the indication from the decoder and prepares two dispatch slots for the instruction.

At 515, the dispatcher 110 sends the logical registers for the instruction operands to the mapper 115. The mapper 115 converts the logical registers (such as GPR) into physical addresses in the regfile 130. The physical addresses are sent to the issue queue when the dispatcher 110 sends the instruction execution information to the issue queue 120.

At 520, the issue queue 120 receives the instruction, the indication that the instruction is a paired type, and any other information required for the issue queue 120 to prepare the instruction for execution e.g., the opcode, instruction type. The issue queue 120 allocates a paired EV 225 and OD 215 of the same entry-n 220.

The control information for the instruction and the first target is stored in the EV 225 of the entry-n 220, and the OD 215 stores the second target for the instruction. (525).

At 530, upon satisfaction of all dependencies, the EV 225 half of the instruction requests the arbitrator 124 to issue the instruction for execution. For example, the instruction and its dependencies are known when it is written to the issue queue 120. As part of the mapper lookup, the mapper 115 can indicate that one of the sources is not yet available, for example, by a pending commit of another instruction. The arbitor 124 maintains an age array of instructions that are pending issue, and may select for issue the oldest instruction in the issue queue 120 having satisfied dependencies.

At 540, the entire instruction entry-n 220 is issued from the issue queue 120 to the execution unit 125 corresponding to the type of instruction. Upon issue, the instruction is removed from the paired issue queue slots, which are made available for another paired instruction or two non-paired instructions.

Figure 6:
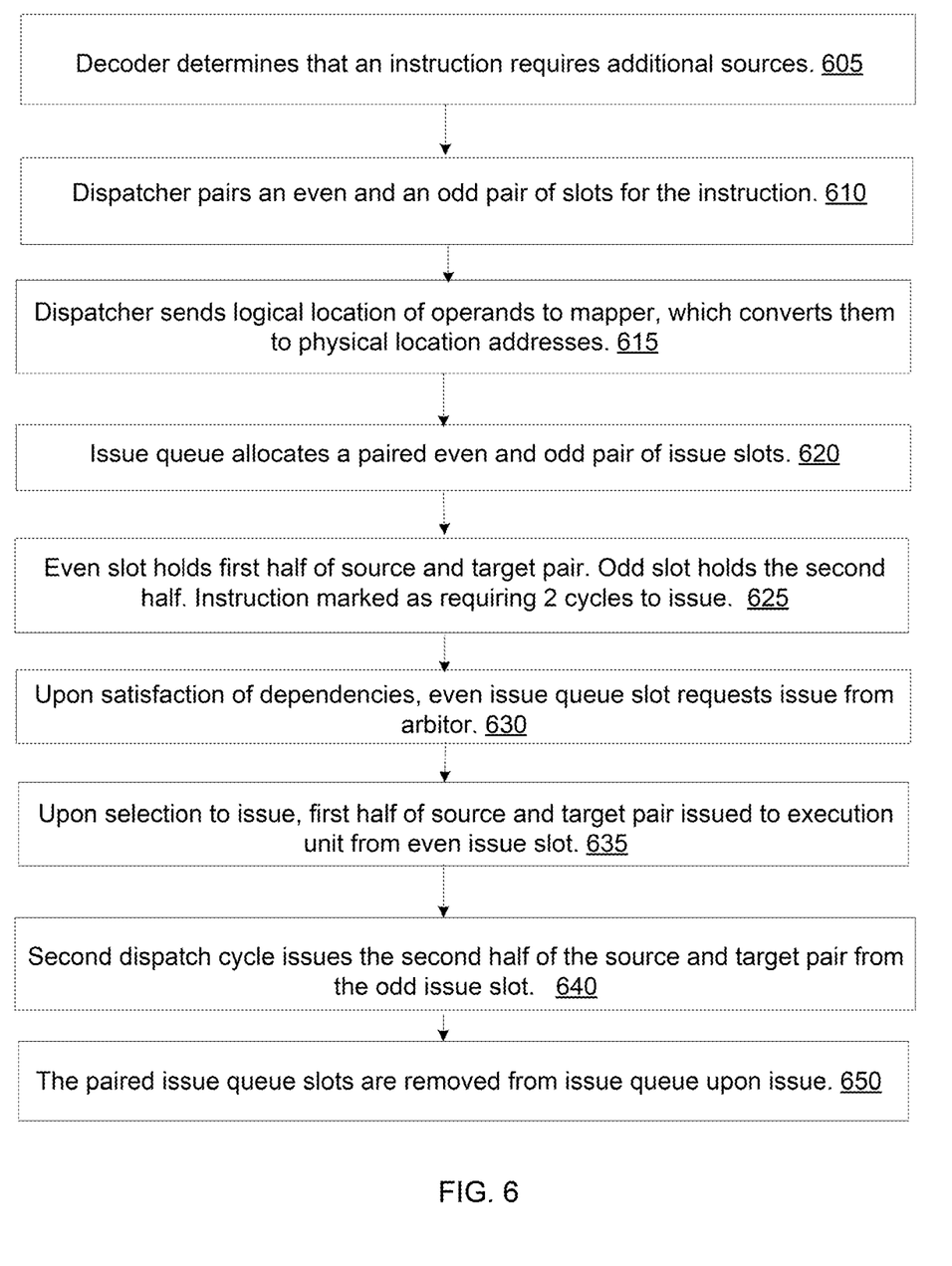
FIG. 6 is a flowchart of issuing paired instructions having additional sources.

FIG. 6 is a flowchart of issuing paired instructions having additional sources.

Based on the indication from the decoder that the instruction requires additional sources, the dispatcher 110 pairs two dispatch slots together to contain all the required sources. The Decimal Floating-Point Add quadword is an example instruction. This instruction takes two pairs of floating point registers (FPR), adds them together and writes the result to a pair of FPRs. This requires four FPR sources and two FPR targets. This instruction is dispatched as a paired instruction entry entry-n 220 where one half of the source and target pairs is placed in the EV 225 even slot and the other half of the pairs is placed in the OD 215 odd slot.

The instruction is written into the issue queue 120 as a full entry pair entry-n 220 with the first half of register pairs in the EV 225 and the second half in the OD 215. The OD 215 is configured as an extension of the EV 225 half. Once all instruction dependencies are met, the EV 225 requests to issue. Once the arbitor 124 grants issue, the issue queue 120 reads the tags for the first half of sources and first half of the targets out from the EV 225 over the even read port 310, and reads out the second half of the targets from the OD 215, also over the even read port 310. For this type of case, the entry-n 220 is marked as requiring two issue cycles. When the arbitor 124 selects the EV 225 to issue, the OD 215 is forced to read out in the next cycle, since it is part of the issue from the EV 225. This allows the instruction to issue in two cycles where the first cycle contains the first half of the FPR sources and the FPR pair for the target. The second cycle will provide the second half of the FPR sources. Once the instruction has been successfully issued, the full entry can be released.

In FIG. 6, at 605, the instruction decoder determines the instruction and its operands do not fit in one either EV 225 or OD 210 issue queue slot in the issue queue 120. The decoder passes an indication to the dispatcher 110 that a paired issue queue entry-n 220 is needed, along with the decoded instruction. The instruction decoder logic is executed prior to the instruction entering the dispatcher 110, and is outside the scope of this flow.

At 610, the dispatcher 110 receives the indication from the decoder and prepares and even and an odd dispatch slot for the instruction.

At 615, the dispatcher 110 sends the logical addresses of the instruction operands to the mapper 115. The mapper 115 converts the logical registers (such as GPR) into physical addresses in the regfile 130. The physical addresses are sent to the issue queue when the dispatcher 110 sends the instruction execution environment to the issue queue 120.

At 620, the issue queue 120 receives the instruction, the indication that the instruction is a paired type, and any other information required for the issue queue 120 to prepare the instruction for execution e.g., the opcode, instruction type. The issue queue 120 allocates a paired EV 225 and OD 215 of the same entry-n 220.

The EV 225 of the entry-n 220 holds the first half of the source and target pair. The OD 215 holds the second half of the source and target pair, and the instruction is marked as requiring two cycles to issue (625).

Once all instruction dependencies are met, the even entry requests to issue (630).

At 635, once the arbitor 124 grants issue, the issue queue 120 reads the tags for the first half of sources and the first half of the targets out from the EV 225 of the entry-n 220. The second half of the target is also read from the OD 215. For this type of case, the entry-n 220 is marked as requiring two issue cycles.

At 640, in the second issue cycle, the second half of the sources from the odd half of the entry-n 220 are read out and presented on the issue interface.

At 650, once the instruction has been successfully issued, the full entry can be released.

Figure 7:
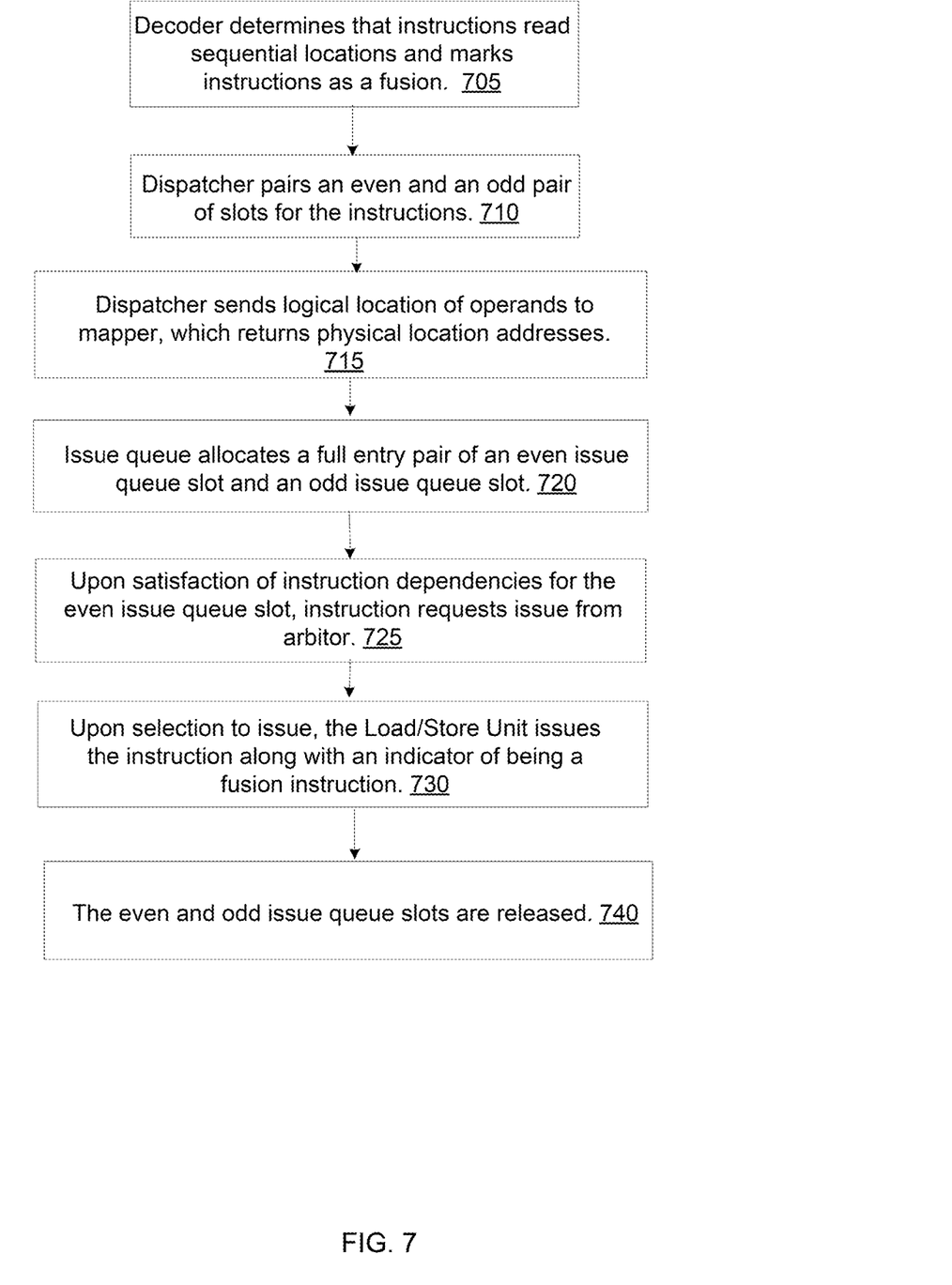
FIG. 7 is a flowchart of fusing two load instructions together in a full entry pair.

FIG. 7 is a flowchart of fusing two load instruction together in a full entry pair.

This is a case where two load instructions read sequential locations. When the decoder detects this situation, the two load instructions are paired together as a load-load fusion, which is allocated as a full entry-n 220 in the issue queue 120. Once all dependencies are clear for the even side, an issue request is made to the arbitor 124. Once the entry wins issue, the issue queue 120 reads out the normal data from the EV 225 and reads out the second target from the OD 215. The data and target are issued to the LSU along with an indication that this is a fused load-load instruction. Once the instruction pair is issued successfully, the full entry pair entry-n 220 is released. The LSU then loads the data as if it were a single instruction of double width. The loaded data is written to the target register pair.

In FIG. 7, at 705, the decoder determines that instructions read back to back sequential locations and marks the instructions as a LD-LD fusion.

At 710, the dispatcher 110 pairs and even and odd pair of dispatch slots for the fused instructions.

At 715, the dispatcher 110 sends the logical addresses of the operands of the instructions to the mapper 115. The mapper 115 converts the logical registers into to physical addresses in the regfile 130.

At 720, the issue queue 120 allocates a full EV 225 and OD 215 pair of the same entry-n 220 of issue slots.

At 725, when the dependencies for the EV 225 instruction are satisfied, that instruction requests issue from the arbitor 124.

At 730, upon selection to issue, the issue queue 120 issues the instruction to the LSU along with the indicator that it is a fused instruction.

At 740, the entry-n 220 is released once the instruction issues successfully.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for supporting complex instructions including the fusion of two instructions together, comprising:
   receiving from an instruction decoder an indication whether an instruction requires pairing;
   based on the indication, allocating in a dispatcher queue one dispatch slot or two paired dispatch slots;
   converting, by a mapper, logical register sources and targets of the instruction to physical regfile addresses;
   based on the indication from the instruction decoder, allocating either one issue queue slot or two paired issue queue slots in an issue queue entry;
   loading execution information for the instruction into the issue queue entry;
   based on satisfaction of execution dependencies, issuing the instruction for execution; and
   following the issuing of the instruction, removing the instruction environment from the issue queue entry in an issue queue.

2. The method of claim 1, wherein the issue queue entry comprises an even slot and an odd slot, and wherein the even slot and the odd slot of the issue queue entry operate independently of each other.

3. The method of claim 1, further comprising:
   based on the indication from the instruction decoder that the instruction is a non-paired instruction, allocating one dispatch slot in the dispatcher queue;
   allocating any available issue queue slot in an available issue queue entry in the issue queue; and
   based on the satisfaction of the execution dependencies, issuing the instruction for execution to an execution unit having logic to execute a type of the instruction.

4. The method of claim 1, further comprising:
   based on the indication from the instruction decoder that the instruction requires additional targets and requires pairing, allocating two paired dispatch slots in the dispatcher queue;
   pairing together the even slot and the odd slot of a same issue queue entry, wherein the even slot stores control information for the instruction; and
   based on the satisfaction of the execution dependencies, the even slot requesting issuing the instruction for execution and causing the additional targets to issue to an execution unit to execute the instruction.

5. The method of claim 1, further comprising:
   based on the indication from the instruction decoder that the instruction requires additional sources and requires pairing, pairing together two dispatch slots in the dispatcher queue and marking the paired instruction as requiring a full issue queue pair;
   pairing together the even slot and the odd slot of a same issue queue entry, wherein the odd slot only holds additional data for the even slot; and
   based on the satisfaction of the execution dependencies, the even slot requesting issuing the instruction for execution in a first dispatch cycle and forcing the odd slot to be read out and presented in a second issue cycle.

6. The method of claim 1, further comprising:
   based on the indication from the instruction decoder that two load instructions read sequential storage locations and can be fused together, pairing together the even slot and the odd slot of a same issue queue entry, and indicating the paired instruction is a fusion instruction;
   based on the satisfaction of the execution dependencies for the even slot, issuing the even slot of the instruction and reading out the instruction target from the odd slot for execution to the load store unit along with the indication that the issued instruction is a fused pair of instructions;
   following the issuing of the instruction, removing the instruction from the issue queue.

7. A computer program product for supporting instruction fusion, wherein the computer program product comprises a computer readable storage medium having program instructions embodied therewith, the program instructions executable by a processing unit to cause the processing unit to perform a method comprising:
   receiving from an instruction decoder an indication whether an instruction is a paired instruction;
   based on the indication, allocating in the dispatcher queue one dispatch slot or a paired dispatch slot;
   converting by a mapper logical addresses of sources and targets of the instruction to physical addresses;
   allocating either one issue slot or a paired issue slot in an issue queue based on the indication from the instruction decoder;
   loading an execution environment for the instruction into the issue queue; and
   based on satisfaction of execution dependencies, issuing the instruction for execution.

8. The computer program product of claim 7, further comprising:
   based on the indication from the instruction decoder that the instruction is a non-paired instruction, allocating one dispatch slot in the dispatcher queue;
   allocating any available even slot or odd slot in the issue queue;
   loading the execution environment for the instruction into the allocated issue queue slot; and
   based on the satisfaction of the execution dependencies, issuing the instruction for execution to an execution unit having logic to execute a type of the instruction.

9. The computer program product of claim 7, further comprising:
   based on the indication from the instruction decoder that the instruction requires additional targets and is a paired instruction, pairing together two dispatch slots in the dispatcher queue;
   pairing together one even slot and one odd slot of the issue queue entry, wherein control information for the instruction is stored in the even slot; and
   based on satisfaction of execution dependencies, the even slot requesting issuing the instruction for execution and causing the additional targets to issue to a load store unit to execute the instruction.

10. The computer program product of claim 7, further comprising:
    based on the indication from the instruction decoder that the instruction requires additional sources and is a paired instruction, pairing together two dispatch slots in the dispatcher queue and marking the paired instruction as requiring two dispatch cycles to issue;
    pairing together the even slot and the odd slot of a same issue queue entry, wherein the odd slot responds only to the even slot; and
    based on satisfaction of execution dependencies, the even slot requesting issuing the instruction for execution in a first dispatch cycle and forcing the odd slot to issue in a next dispatch cycle.

11. The computer program product of claim 7, further comprising:
- based on the indication from the instruction decoder that two load instructions read sequential storage locations, pairing together the even slot and the odd slot of a same issue queue entry, and indicating the paired instruction is a fusion instruction;
- based on the satisfaction of the execution dependencies for the even slot, issuing the even slot of the instruction and issuing the instruction target from the odd slot for execution to the load store unit and the indication of being a fusion instruction;
- following the issuing of the instruction, removing the instruction environment from the issue queue; and
- the load store unit loading the sequential storage locations into the targets.

12. The computer program product of claim 7, wherein the issue queue entry comprises an even slot and an odd slot, and wherein the even slot and the odd slot of the issue queue entry operate independently of each other.

13. The computer program product of claim 7, wherein the even slot and the odd slot of a same issue queue entry are paired together to act as one issue queue entry based on instruction complexity, and wherein the paired instruction is executed in one dispatch cycle.

14. A computer system for supporting instruction fusion, comprising:
- one or more processors; and a computer-readable memory coupled to the one or more processors, the computer-readable memory comprising instructions for:
- receiving from an instruction decoder an indication whether an instruction is a paired instruction;
- based on the indication, allocating in the dispatcher queue one dispatch slot or a paired dispatch slot;
- converting by a mapper logical addresses of sources and targets of the instruction to physical addresses;
- allocating either one issue slot or a paired issue slot in an issue queue based on the indication from the instruction decoder;
- loading an execution environment for the instruction into the issue queue; and
- based on satisfaction of execution dependencies, issuing the instruction for execution.

15. The computer system of claim 14, further comprising:
- based on the indication from the instruction decoder that the instruction is a non-paired instruction, allocating one dispatch slot in the dispatcher queue;
- allocating any available even slot or odd slot in the issue queue;
- loading the execution environment for the instruction into the allocated issue queue slot; and
- based on satisfaction of execution dependencies, issuing the instruction for execution to an execution unit having logic to execute a type of the instruction.

16. The computer system of claim 14, further comprising:
- based on the indication from the instruction decoder that the instruction requires additional sources and is a paired instruction, pairing together two dispatch slots in the dispatcher queue and marking the paired instruction as requiring two dispatch cycles to issue;
- pairing together the even slot and the odd slot of a same issue queue entry, wherein the odd slot responds only to the even slot; and
- based on satisfaction of execution dependencies, the even slot requesting issuing the instruction for execution in a first dispatch cycle and forcing the odd slot to issue in a next dispatch cycle.

17. The computer system of claim 14, further comprising:
- based on the indication from the instruction decoder that the instruction requires additional targets and is a paired instruction, pairing together two dispatch slots in the dispatcher queue;
- pairing together one even slot and one odd slot of the issue queue entry, wherein control information for the instruction is stored in the even slot; and
- based on satisfaction of execution dependencies, the even slot requesting issuing the instruction for execution and causing the additional targets to issue to a load store unit to execute the instruction.

18. The computer system of claim 14, further comprising:
- based on the indication from the instruction decoder that two load instructions read sequential storage locations, pairing together the even slot and the odd slot of a same issue queue entry, and indicating the paired instruction is a fusion instruction;
- based on satisfaction of execution dependencies for the even slot, issuing the even slot of the instruction and issuing the instruction target from the odd slot for execution to the load store unit and the indication of being a fusion instruction;
- following the issuing of the instruction, removing the instruction environment from the issue queue; and
- the load store unit loading the sequential storage locations into the targets.

19. The computer system of claim 14, wherein the issue queue entry comprises an even slot and an odd slot, and wherein the even slot and the odd slot of the issue queue entry operate independently of each other.

20. The computer system of claim 14, wherein the even slot and the odd slot of the issue queue entry are paired together to act as one issue queue entry based on instruction complexity, and wherein the paired instruction is executed in one dispatch cycle.

* * * * *